United States Patent [19]

Borland

[11] Patent Number: 5,401,533
[45] Date of Patent: Mar. 28, 1995

[54] METHOD OF MAKING RESEALABLE PACKAGING MATERIAL

[75] Inventor: G. Barton Borland, Pleasanton, Calif.

[73] Assignee: Sealright Co., Inc., Kansas City, Mo.

[21] Appl. No.: 192,388

[22] Filed: Feb. 7, 1994

Related U.S. Application Data

[63] Continuation-in-part of Ser. No. 790,647, Nov. 8, 1991, abandoned.

[51] Int. Cl.⁶ .............................................. B05D 5/10
[52] U.S. Cl. ............................ 427/208.2; 427/208.4; 427/208.6; 427/208.8; 427/258; 427/286; 427/407.1
[58] Field of Search ............... 427/208.6, 208.2, 208.4, 427/208.8, 258, 286, 407.1

[56] References Cited

U.S. PATENT DOCUMENTS

| | | | |
|---|---|---|---|
| 2,336,706 | 12/1943 | Sunderhauf | 229/212 |
| 3,104,793 | 9/1963 | Hickin | 229/221 |
| 3,133,689 | 5/1964 | Rossi | 229/221 |
| 3,568,910 | 3/1971 | McConnell | 229/125.42 |
| 4,174,597 | 11/1979 | Mowli et al. | 53/410 |
| 4,438,850 | 3/1984 | Kahn | 229/123.1 |
| 4,500,021 | 2/1985 | Bildusas | 225/49 |
| 4,633,508 | 12/1986 | Sanders | 383/95 |
| 4,722,166 | 2/1988 | Dieckow | 53/133.4 |
| 4,781,323 | 11/1988 | Elias et al. | 229/123.3 |
| 4,785,940 | 11/1988 | Wilson | 383/204 |
| 4,786,190 | 11/1988 | Van Erden et al. | 383/61 |
| 4,913,560 | 4/1990 | Herrington | 383/71 |
| 5,089,320 | 2/1992 | Straus et al. | 428/216 |

Primary Examiner—Bernard Pianalto
Attorney, Agent, or Firm—Kokjer, Kircher, Bowman & Johnson

[57] ABSTRACT

A packaging material for reclosable bags and methods for making same. The material includes a standard packaging material substrates including an initial seal layer, typically for forming a heat seal. A layer of a secondary seal material, typically a tacky material such as a pressure sensitive adhesive is applied in localized areas corresponding to the seal area for the bag. The initial seal layer may have a reduced thickness in this localized area to reduce thickness variation in the finished material. An outer seal layer is provided over the secondary seal area. This outer seal layer may be localized to cover only the secondary seal layer. The outer seal layer may additionally or alternatively have a reduced thickness in the localized area of the secondary seal layer to again reduce thickness variation. Various process are available for providing the layers. In one embodiment, the secondary and outer seal layers are applied by use of a ribbon coater. This application may be directly upon the substrate, or upon a release sheet for later transfer to the substrate.

9 Claims, 3 Drawing Sheets

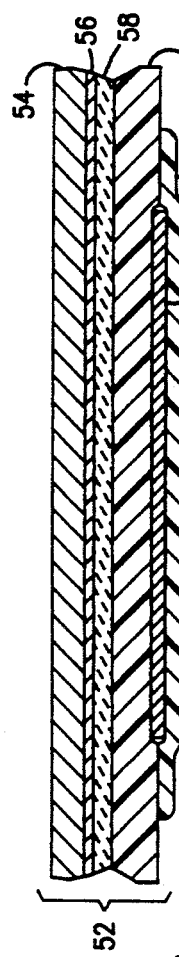
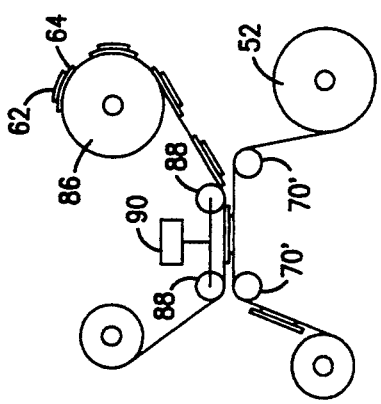
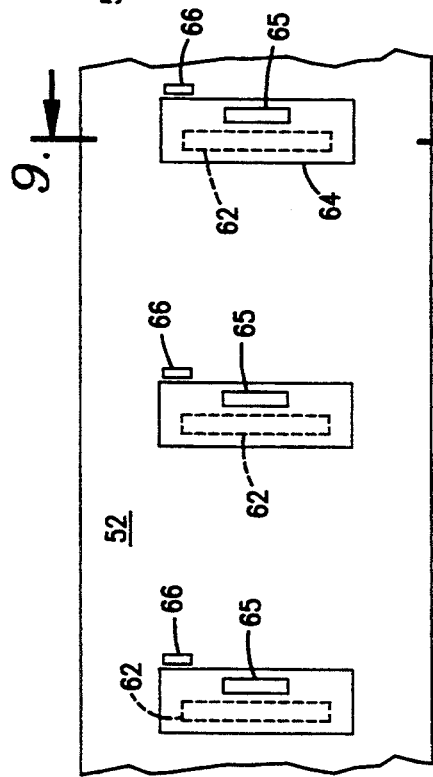
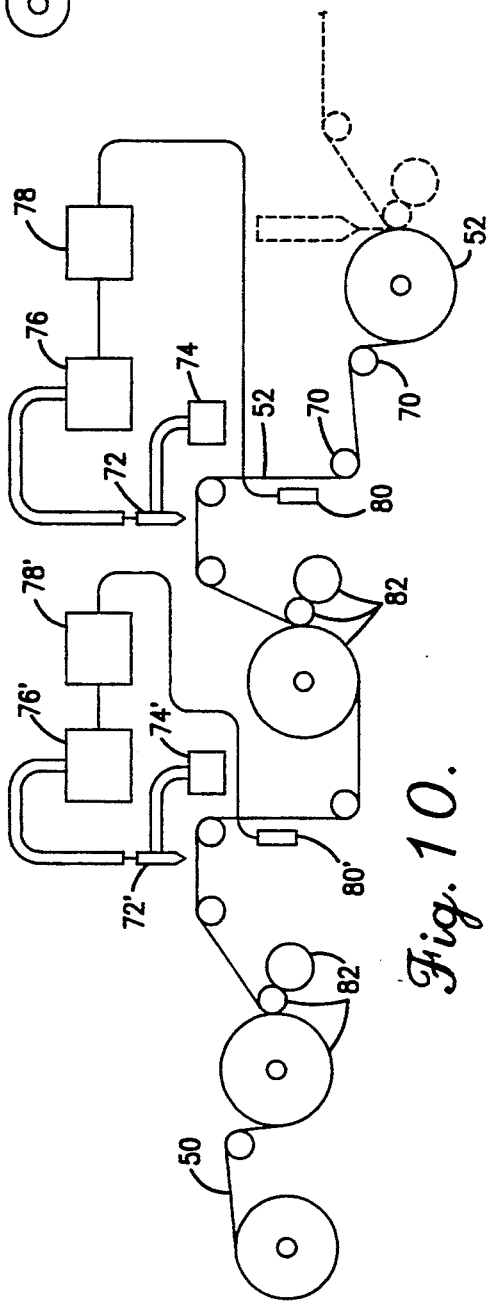

METHOD OF MAKING RESEALABLE PACKAGING MATERIAL

CROSS-REFERENCE TO RELATED INVENTIONS

This application is a Continuation-in-Part of U.S. Ser. No. 07/790,647, filed Nov. 08, 1991, now abandoned, which is included herein by reference.

BACKGROUND OF THE INVENTION

1. Field of the Invention

The present invention relates in general to packaging materials for use in flexible bags. In particular, the present invention relates to an improved packaging materials for use in resealable bags, such as for food, and methods of making such materials.

2. Description of the Related Art

For many years it has been known to package various products, and in particular loose food products, in flexible bags. In recent years it has become increasingly common to form such bags using the so-called form, fill, and seal technique. This technique employs a roll of flexible packaging material which is fed to an apparatus which forms the flexible bag simultaneously with placing the product within the bag. This is an extremely fast and economical approach which produces quality packages.

Regardless of the method employed to form the package, one persistent problem with such flexible bags is their poor ability to be reclosed. It is common for a single flexible bag to hold more product than is desired to be used in a single application or use. This is often the case with food items such as coffee, snack chips, etc. While such bags are provided with adequate seals upon initial forming, once these seals are first broken to open the package, it is difficult to reclose the bag to the degree desired. In such situations it is often desired to reclose the bag sufficiently to at least prevent the product from inadvertently spilling from the bag, and often a greater seal is desired to retain freshness of the product and/or prevent contamination of the product.

Various devices have been proposed to attach to the bag after opening to allow the bag to be reclosed. Certain of these devices, such as clips, are only marginally adequate in their ability to achieve the desired seal. Even where such devices work properly, there is the additional expense to obtain such devices, and the effort to find and properly employ the devices.

As an alternative, it has been proposed to form the material of the bag with means for adhesive reclosure. One example of this is shown in U.S. Pat. No. 3,454,210 to Spiegel et al. Spiegel et al. propose a packaging material having a substrate (polyester and polyethylene laminate) upon which is coated a layer of a tacky adhesive. A further, thin layer of non-tacky material (polyethylene) is then placed over the tacky layer. This sheet material is then bonded to a standard package material, with the outer, thin non-tacky layer providing an initial heat seal bond with the standard sheet packaging material.

In use, the initial heat seal has a strength and sealing quality similar to standard bags. Upon opening, however, the thin non-tacky layer ruptures about the seal and is retained upon the sheet of standard packaging material, thus revealing the tacky adhesive. The tacky adhesive at the seal area may then be used to bond the sheets together numerous times to retain freshness and prevent contamination.

With the emergence of the use of form, fill, and seal machinery, this substrate/tacky adhesive/thin non-tacky layer combination was proposed for use in such machinery. This is shown in U.S. Pat. No. 5,089,320 to Strauss et al. The basic material is substantially identical in both Strauss et al. and Spiegel et al., but in the Strauss et al. method the material is bonded to itself, as is common in "form and fill" machinery, rather than to a separate, standard, material.

SUMMARY OF THE INVENTION

An object of the present invention is to provide a packaging material for flexible bags which allows the bags to be reclosed.

Another object of the present invention is to provide such a material having localized areas of reclosability.

A further object of the present invention is to provide such a material having reduced thickness variations despite such localization, to provide smoother rolling and unrolling of the material, and to reduce or eliminate straching of the material caused by "lumps".

Yet another object of the present invention is to provide methods of making such material.

Another object of the present invention is to provide such methods which result in precise localized areas of reclosability.

Yet another object of the present invention is to provide such a method which may be employed with standard, previously manufactured, packaging material.

A further object of the present invention is a method of making packaging material which may be employed without reclosable features, or may be subject of further steps providing reclosability.

These and other objects are achieved by a packaging material for reclosable bags and methods for making same. The material includes standard packaging material substrates typically used for "form and fill" machinery. Such substrates include an initial seal layer, typically for forming a heat seal. A layer of a secondary seal material, typically a tacky material such as a pressure sensitive adhesive, will be applied in localized areas corresponding to the seal area for the bag. The initial seal layer may have a reduced thickness in this localized area to reduce thickness variation in the finished material. As the tacky secondary seal material would foul the "form and fill" machinery, an outer seal layer is provided over the secondary seal area. This outer seal layer may be localized to cover only the secondary seal layer. The outer seal layer may additionally or alternatively have a reduced thickness in the localized area of the secondary seal layer to again reduce thickness variation. Various processes are available for providing the layers. In one embodiment, the secondary and outer seal layers are applied by use of a ribbon coater, providing precise control for application area and thickness. This application may be directly upon the substrate, or upon a release sheet for later transfer to the substrate.

BRIEF DESCRIPTION OF THE DRAWINGS

The objects and features of the invention noted above are explained in more detail with reference to the drawings, in which like reference numerals denote like elements, and in which:

FIG. 8 is a top view of a web of packaging material according to a second embodiment;

FIG. 9 is a cross-sectional view along line 9—9 of FIG. 8;

FIG. 10 is a schematic view showing a first process of making the material of FIG. 8; and FIG. 11 is a schematic view showing a second process of making the material of FIG. 8.

DETAILED DESCRIPTION OF THE INVENTION

Figure 1:
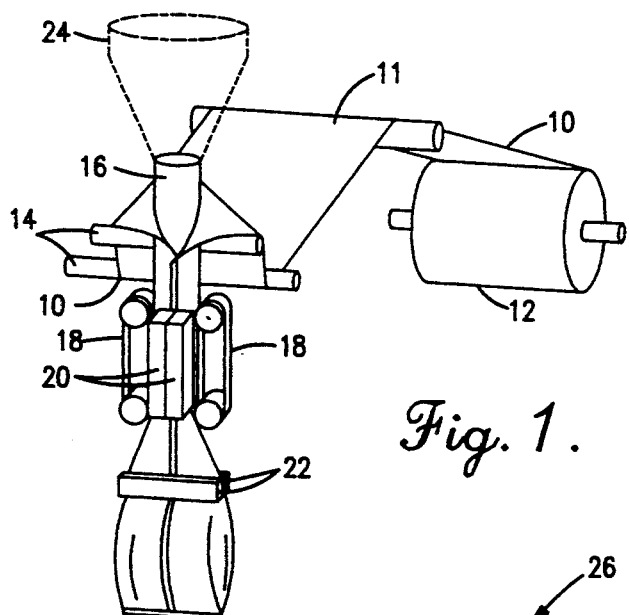
FIG. 1 is a perspective view of a prior art form, fill and seal process.

Prior to discussing the materials and processes of the present invention, prior art bag forming methods will be described. With reference to FIG. 1, there is shown an operating form, fill, and seal device or machine. The device receives web material 10 from a roll 12. In its simplest form, the web material includes a substrate having an inner face 11, with the inner face 11 either having sealable properties to itself, or including a layer (not shown) having sealable properties to itself. This sealing may be by several means, but is most typically a heat seal. Additionally, this inner face has a sufficiently low coefficient of friction to allow the web to smoothly pass through the form, fill and seal machine described below.

The web passes through various idle and/or tension rollers 14. The longitudinal edges of the web 10 are then caused to be wrapped about a tubular mandrel 16. The mandrel is sized such that its diameter is slightly smaller than the width of the web, so that the lateral edge portions of the web may be brought together in abutting relation, The web is drawn downward over the mandrel while it is maintained in surrounding relation to the mandrel. This motion may be effected by appropriate power belts 18 engaging the exterior of the web. The abutting lateral edge portions of the web are then sealed together to form a fin seal. This may be effected by pressure or other means, but is preferably performed by a heated fin sealer 20.

The lower end of the mandrel is located adjacent the fin sealer. At this point the web has been formed into a tubular configuration, and passes below the lower end of the mandrel. Spaced below the fin sealer are a pair of end seal jaws 22 which reciprocate between open and closed positions. The jaws may be heated to form a heat seal in the packaging material, or may form a seal by pressure, ultrasonic bonding, etc.

When in the closed position the jaws 20 will squeeze the tube of packaging material into a flat configuration, and will bond the packaging material to itself. The longitudinal length of this bond is twice what is required for a single seal, and a lateral cut is made at an intermediate line in the seal. Subsequent to forming this seal the product to be packaged is passed from a hopper 24 through the tubular mandrel into the tube of packaging material. The downward movement of the product is halted by the presence of the end seal.

The jaws 22 are moved to the open position and the tube of packaging material is then advanced by the length of one bag. The jaws are then moved to the closed position to again form a seal and a cut. As may be envisioned, this will seal the upper end of the bag, and cut the bag from the tube of material. Simultaneously, the lower seal of the next bag will be formed. The product is then introduced into the next bag, the material advanced, and another seal made to form the next bag, with this process repeating itself.

Figure 2:
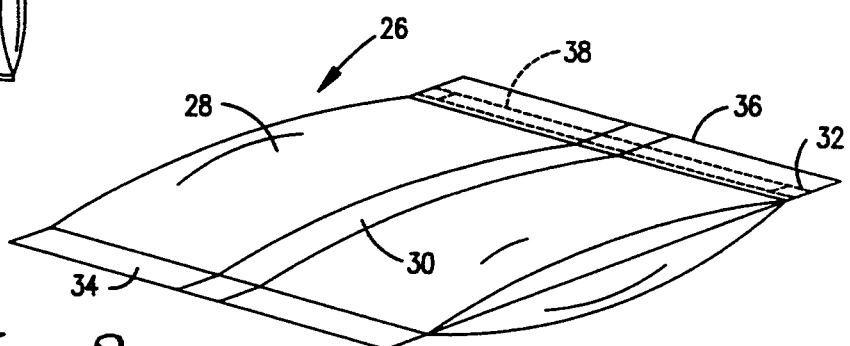
FIG. 2 is a perspective view of a resealable bag according to the present invention.

A bag made according to this method typically has an appearance as shown in FIG. 2, and is generally designated by reference numeral 26. The bag 26 includes a body 28 formed of a length of packaging material formed into a tube by fin seal 30, as described above. Each longitudinal end of the bag has been flattened radially (laterally) and the interior face of the packaging material sealed to itself. This forms a top seal 32 and a bottom seal 34.

It may be preferred to space the top seal 32 longitudinally inward of a top edge 36 of the bag. This will allow the user to grasp the bag material at the top edge 36 and more easily pull the bag open. As a further alternative, there may be provided a secondary top seal (not shown) spaced from the top seal 32 in the longitudinal direction and including the top edge 36. Indicia and/or perforations (not shown) would then extend laterally across the bag at a longitudinal position intermediate the top seal and secondary top seal. This may be employed to aid the user in cutting or tearing the bag intermediate these seals. In this manner the secondary top seal will act as a tamper indicating seal.

The above features are common to many prior art bags. To make the bag 26 reclosable, however, the above-referenced patent to Spiegel et al. teach that there is provided tacky material 38 within the periphery of the top seal 32 on the inner face 11 of the web. As noted above, the inner face must have a low coefficient of friction, and as such Spiegel et al. teach that a further layer 40 (FIG. 4) of low friction, sealable material is formed over the tacky material.

Figure 3:
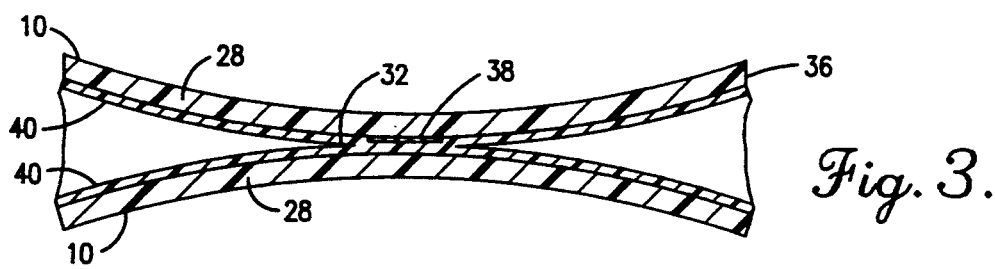
FIG. 3 is a cross-sectional view of a top seal area of the bag of FIG. 2, in the sealed condition.
Figure 4:
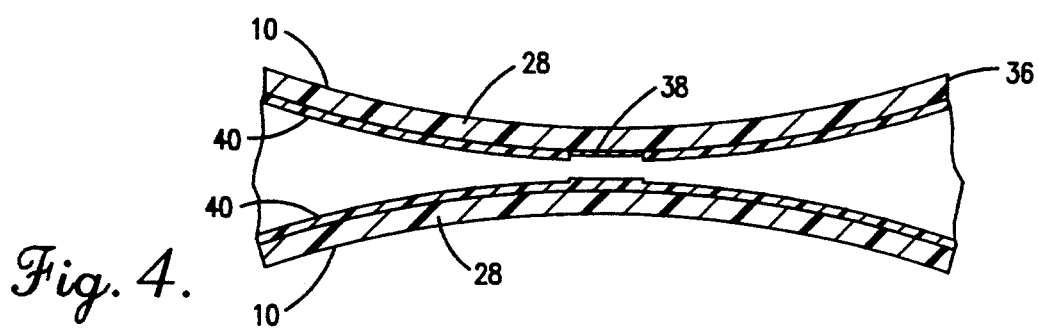
FIG. 4 is a cross-sectional view of a top seal area of the bag of FIG. 2, in the opened condition.

The reclosable feature taught by Spiegel et al. is illustrated in FIGS. 3 and 4, which are cross-sectional side views looking along the plane of the top seal 32. As may be seen in FIG. 3, the web 10 will have the layer of tacky material 38 in the area of the top seal, with the layer 38 being covered with the further layer 40, and the layer 40 sealed to itself. This provides a standard initial seal similar to non-reclosable bags.

Upon the user applying a force to open the initial seal, the layer 40 ruptures about the tacky layer 38, causing the tacky layer to be exposed. Spiegel et al. notes several possible ways in which the tacky layer may be disposed upon rupture. For example, the tacky layer 38 may remain upon the substrate 10 in its original position, or it may remain upon the interior face of the further layer 40 (on the opposite of the original side), or it may shear within its thickness and adhere to both the substrate 10 and the layer 40.

Regardless of the particular final disposition of the tacky layer, the tacky layer is exposed, such that it may be used to form at least one, and preferably numerous, reclosures of the bag 10.

With the above background material outlined, attention is drawn to the improvements of the present invention.

Figure 5:
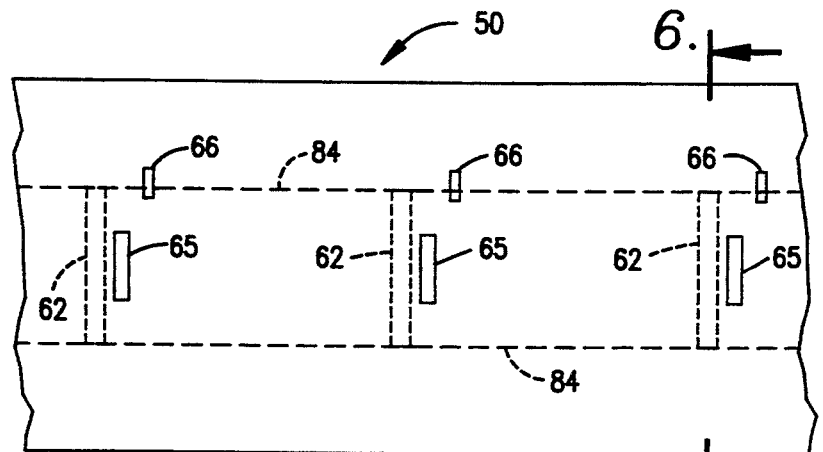
FIG. 5 is a top view of a web of packaging material according to a first embodiment.
Figure 6:
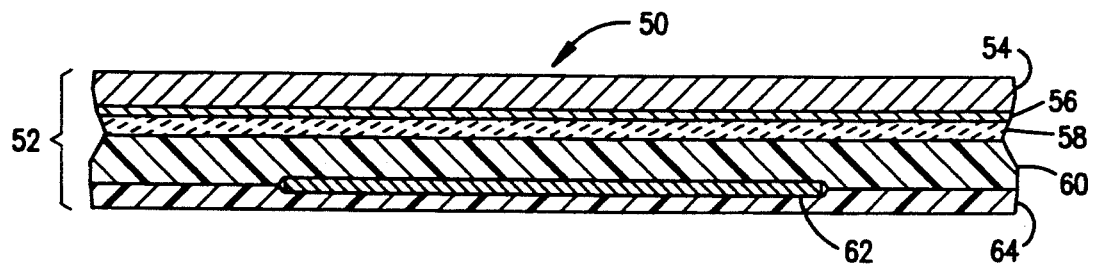
FIG. 6 is a cross-sectional view along line 6—6 of FIG. 5.

FIGS. 5 and 6 show a first embodiment of a packaging material, generally designated 50, according to the present invention. As is best shown in FIG. 5, the material is in the form of a web elongated in a longitudinal direction (left to right in FIG. 5) and having a lateral extent. This lateral extent is shown in the drawings as being the width for a single bag, but it will be apparent that material having multiple bag widths may be produced and then cut or slit to form single-bag widths.

With particular reference to FIG. 6, the material will include a substrate 52. The substrate may be single or multilayer, but is preferably multi-layer. The multiple layers will typically be diverse materials, but may be multiple layers of an identical material. The substrate may be formed by a variety of methods, including coextrusion, extrusion lamination, adhesive lamination and combinations thereof.

Where the substrate is formed of multiple diverse materials, these materials typically serve particular functions such as providing strength, vapor barriers, consumer-visual indicia, etc. Typical materials include metal foils, polyester, cellophane, high density polyethylene, typical printing inks, etc. As an example, the substrate 52 of FIG. 6 includes a base layer 54 acting as a support, and formed, for example, of cellophane. The inner face of the base layer is then provided with an indicia layer 56 of an ink pattern providing advertising, product information, etc. The inner face of the indicia layer is then provided with a primer or adhesive layer 58 compatible with both the indicia layer and the subsequent layer.

The inner face of the primer layer 58 is next provided with an initial seal layer 60. The initial seal layer is formed of a material having low friction to allow use in the "form and fill" machine, and preferably is capable of forming a heat seal to itself. For example, the initial heat seal layer may be polyethylene, with the thickness being typical for forming a heat seal in non-reclosable packages, i.e. between about 0.5 and 2.0 mils. Other possible materials include ethylene/vinyl acetate copolymers or certain ionomers such as SURLYN ™ available from DUPONT ®.

Each of the layers comprising the substrate 52 is preferably coextensive. In other words, each layer extends the full lateral width and the full longitudinal length of the material. As may be envisioned, this substrate could be used to form standard non-reclosable bags, as will be discussed more below.

To allow the material to be used as a reclosable bag, there is provided a secondary seal layer 62 formed of a tacky material such as a pressure sensitive adhesive. Various tacky materials may be employed for layer 62, although the preferred methods according to the present invention limit these possibilities, as explained more fully below. As the tacky material inherently includes a high coefficient of friction, allowing the tacky material to be exposed will foul the "form and fill" machine.

To overcome this problem, there is provided an outer layer of low friction seal material 64. This material is preferably similar or identical to the initial seal layer. Again, polyethylene is a good candidate at thickness in the range of about 0.2–0.7 mils (0.4 mil being preferred), although other materials may be employed. The outer seal layer 64 typically will have a lesser thickness than the initial seal layer, although material properties of course affect this determination. In general, the initial, secondary and outer seal layers must only meet the criterion for bonding and rupturing as set forth by Spiegel et al.

As is apparent from comparison of FIGS. 5 and 6, the initial and outer seal layers in this embodiment are coextensive, while the secondary seal layer of tacky material is localized. In particular, the secondary seal layer is localized to areas which correspond to the full lateral extent of one side of the top seal 32 only (in other words, only that area which needs to be reclosable). While the secondary seal layer could be coextensive, the illustrated, localized, embodiment uses less of the tacky material to reduce cost, and results in only the typical firm seal at the bottom of the bag. To aid in placement of the localized tacky material, the indicia layer 56 may include locating strips 65 and/or 66.

The material 50 may be formed in many ways. For example, the substrate may be formed by standard methods such as extrusion lamination or coextrusion. Where the secondary and outer seal layers are coextensive these same methods may be employed to form the entire material 50 in a "single" step. However, where the secondary seal layer is localized, these localized areas may be placed by various methods, such as Meyer rod, rotogravure, etc.

In the preferred embodiment, however, the localized areas of secondary seal 62 are formed by use of a ribbon coater for improved accuracy and uniformity. A suitable ribbon coater is available from Graco LTI of Monterey, Calif., or from Accumeter of Marlborough, Mass. Such ribbon coaters provide very good continuous or intermittent pattern coatings at relatively high speeds, but are limited as to the types of materials which may be applied. In particular, ribbon coaters are known to be limited to materials having a relatively narrow range of viscosities, typically between about 1,000–5,000 cP (mPa/s).

As typical hot melt pressure sensitive adhesives have viscosities at application temperature much greater than this range (typically many tens of thousands to hundreds of thousands cP), standard hot melt pressure sensitive adhesives clearly can not be employed with ribbon coaters. However, a small number of hot melt pressure sensitive adhesives having viscosities at application temperature falling within the range of ribbon coaters have recently become commercially available. For example, one preferred pressure sensitive adhesive is commercially available from the H. B. Fuller Co. of St. Paul, Minn. under product no. HL-2115-X. This adhesive has a viscosity at application temperature (approx. 162° C.) of 1,100 cP, and a melt index of greater than 100. It is only through use of such adhesives that the use of ribbon coaters is possible.

Figure 7:
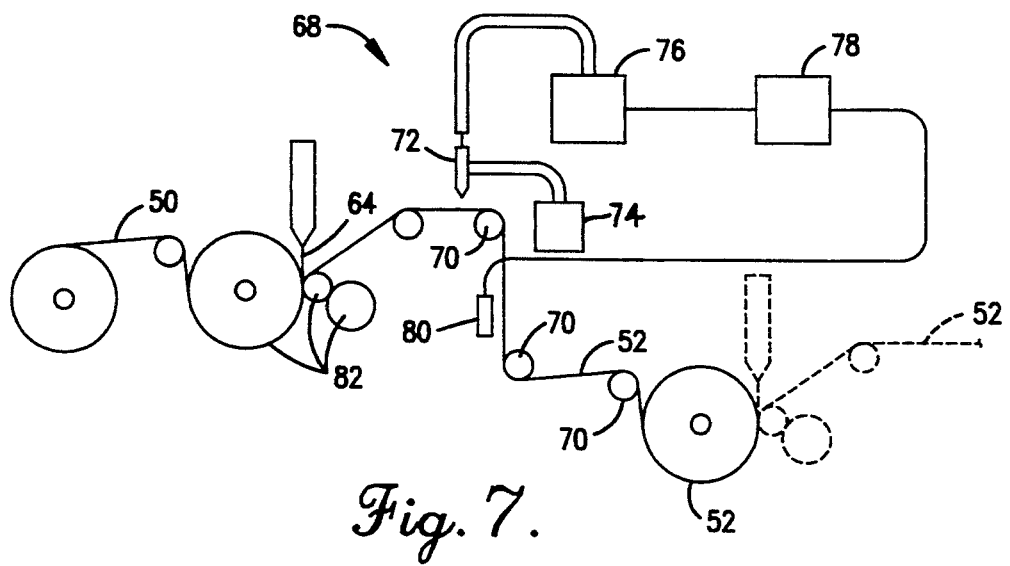
FIG. 7 is a schematic view showing a process of making the material of FIG. 5.

With reference to FIG. 7 there is schematically shown an apparatus 68 for forming the material 50, and with reference to this apparatus the preferred method will be described.

First, the substrate 52 is formed by prior art methods. As illustrated by the dashed rollers and substrate 52 in FIG. 7, this step may be part of a continuous process for forming the material 50. However, the substrate 52 may be formed and rolled, and then stored in rolled condition until it is desired to produce the material 50. It is noted that the substrate 52 will often be capable of use in forming standard non-reclosable bags. As such, the amount of inventory may be reduced by using this same substrate for both end uses.

In any event, the substrate 52 will pass through various idle and/or tensioning rollers 70. A ribbon coater head 72 will be located in position to apply the secondary seal layer to the inner face of layer 60, and appropriate control apparatus for the ribbon coater head will also be provided. In particular, there may be provided a valve 74, melt delivery equipment 76 and a pattern controller 78. The pattern controller 78 is preferably operatively connected to a sensor 80 which will sense the eye or locator spots 65 or 66. The thickness of the secondary seal layer will typically be within the range of 0.5 and 1.5 mils, with 1.0 mils being preferred for the adhesive noted above. Different adhesive materials having different properties will of course require different thicknesses.

After application of the localized secondary seal layer there is applied the outer seal layer 64. This application may be by standard extrusion lamination, with the material then passing by a chill and cool pinch roller assembly 82 to set the layers 62 and 64. The material 50 is then rolled for shipping or storage.

From the above description it should be apparent that this method may be an integral part of a larger continuous process of making packaging material, or may be a separate method performed upon substrate material previously formed. As noted above, this permits substrate material useful for both standard (non-reclosable) and reclosable bags to be produced, with this substrate material only later being provided with the additional layers necessary for reclosable bags. This of course reduces inventory requirements.

Additionally, this method need not be performed at the site of manufacture of the substrate material. In particular, the method of adding the layers 62 and 64 to the substrate may be performed on the site having the form, fill, and seal equipment. This allows the manufacturer of the consumer product to quickly implement production of consumer product in reclosable bags, without the need to wait for, or store, separate material 50.

As may be envisioned, the material 50 described above, with the localized areas of secondary seal layer 62, results in a lumpy roll upon winding for shipping or storage, due to the thickness variations in the material 50. While this is unsightly, it also may result in speed variation during winding at the end of the apparatus 68, which could cause misplacement of the localized areas 62 and/or thickness variation in the extruded outer layer 64. Similar speed variations and/or cyclic stresses may be induced upon unwinding at the form, fill and seal machine. These "lumps" in the roll may also cause the material to be streched over the lump, deforming the material.

To reduce or eliminate these possible problems it is possible to form one or both of the initial and outer layers 60 and 64 with thickness variation in the lateral direction to provide a reduced thickness in the lateral extent of the secondary seal layer 62. Such thickness variation may be achieved by appropriate variation in the outlet of the extruder for the layer(s). FIG. 6 shows an example where both layer 60 and 64 include a reduced thickness area corresponding to the lateral extent of the layer 62, such that the thickness of the material 50 is substantially constant in the lateral direction at the localized areas 62.

It is noted that this thickness variation in the layer 60 and/or 64 extends the full longitudinal length of the material 50. As such, in the sections of material 50 which are longitudinally between the localized layers 62, there will be a reduced thickness compared to the material 50 within the periphery of a layer 62. This is illustrated by dashed lines 84 in FIG. 5. While there is such a thickness variation laterally within the lines 84, the sections of the material 50 laterally exterior of lines 84 have a substantially constant thickness. This should result in a roll having a smooth appearance and winding/unwinding characteristics.

While FIG. 6 shows an example where both layers 60 and 64 include a thickness variation, only one of these layers may have such variation. Where such variation is present, the smallest thickness of the layer should of course still be sufficiently thick to provide the required bond. As an example, the outer layer 64 should have a minimum thickness of approx. 0.3 mil in the example given. Additionally, while the layers 60 and 64 are varied sufficiently to result in a substantially constant thickness in FIG. 6, a lesser variation in their thicknesses would reduce problems associated with uneven winding, while not eliminating them to the degree illustrated in FIG. 6.

With reference to FIGS. 8 and 9 there is shown a second embodiment of the present invention. This embodiment is substantially similar to the first embodiment, and thus has similar reference numerals, with the exception that the outer layer 64 is not coextensive, but is localized in a manner similar to layer 62.

Since the outer layer 64 provides the low friction necessary to allow passage through packaging machinery, the outer layer 64 must at least fully cover the secondary seal layer 62. In practice, the outer layer will typically extend peripherally beyond the entire area of the layer 62 to ensure coverage in case of slight misalignment. As shown in FIG. 8, if the outer layer 64 is an opaque material, it may be used to cover and obscure one or both of the spots 65 and 66 to provide improved appearance on the interior of the package.

As may be envisioned, the thickness variation with this second embodiment would be even greater than the first embodiment, as the lateral edges of the material 10 will have a thickness corresponding to only the substrate, without the outer layer 64. As such, it may be preferred to provide a thickness variation in the layer 60 and/or 64 in a manner similar to that discussed above. As an example, FIG. 9 shows the initial seal layer 60 having a reduced thickness area laterally corresponding to the position of the secondary seal layer 62. As before, this reduced thickness in layer 60 will extend the full longitudinal length of the material 50 where the layer 60 is extruded. The illustrated arrangement serves to lessen the amount of thickness variation in the material 50 to reduce the problems associated with a lumpy roll.

Other arrangements are of course possible to further reduce thickness variation. For example, the lateral extent of the thickness variation in layer 60 could be extended to encompass the lateral extent of outer seal layer 64. If thickness variation in the layer 60 were set to equal the combined thickness of the layers 62 and 64, this would result in an arrangement equivalent to that shown in FIG. 6.

As with the layer 62, the localized application of the outer layer 64 my be achieved by several methods, such as rotogravure, flexographic printing, etc. However, it is preferred to employ a ribbon coater as used for the layer 62. Again, ribbon coaters require materials having a viscosity within about 1,000–5,000 cP at application temperature. One suitable material having the desired low friction, heat sealability, and viscosity is commercially available from the H. B. Fuller Co. of St. Paul Minn. under product no. HL-7068-X. This material has a viscosity at application temperature (approx. 162° C.) of approximately 2,000 cP. As may be seen, this heat seal material therefore has a viscosity (at application temperature) which would not permit extrusion.

With reference to FIG. 10 there is schematically shown an apparatus 68' for forming the material 50 of the second embodiment, and with reference to this apparatus the preferred method for forming this embodiment will be described.

The formation of the substrate and application of the localized secondary seal layer 62 by use of a ribbon coater is as described above in the first embodiment, and as such has like reference numerals.

After the application of the layer 62 the material may be fed through a chill and cool pinch roller assembly 82 to set the layer 62. Since the layer 62 is inherently a tacky material, the assembly 82 must be formed with Teflon ® or other low friction rollers. While this may be employed, it is preferred to simply do without the assembly 82. In other words, upon application of the layer 62, the material is guided directly to a second ribbon coater for application of the layer 64.

This second ribbon coater is very similar to the first, and thus may include a head 72' to apply the layer 64, a valve 74', melt delivery equipment 76' and a pattern controller 78'. The pattern controller 78' is preferably operatively connected to a sensor 80' which will sense the eye or locator spots 65 or 66. The thickness of the outer layer 64 will typically be within the range of 0.2 and 0.7 mils, with 0.4 mils being preferred for the material noted above. Different materials having different properties will of course require different thicknesses.

After application of the localized outer seal layer 64 the material is passed by a chill and cool pinch roller assembly 82 to set the layers 62 and 64. The material 50 is then rolled for shipping or storage.

This method of course has the same advantages as described above with regard to FIG. 7.

A second method for forming the material of FIGS. 8 and 9 is now described with reference to FIGS. 10 and 11. With reference to FIG. 10, where the above-described process stands alone and is performed upon existing rolled substrate material, the general steps are to simply apply the two layers 62 and 64 to the substrate in the correct position. In this second method, these general steps are still performed, but are performed upon a double sided release sheet 86, and in the opposite order.

In other words, the roll of substrate 52 at the far right in FIG. 10 is replaced with a roll of sheet material 86 having a low friction release coating, such as silicone, on both faces. The release sheet 86 passes through the same rollers and under the same ribbon coaters, with the sole further exception being that the outer layer 64 is first applied to the release sheet 86, and then the secondary seal layer 62 is applied upon the layer 64. The relative sizes of the layers remains the same as above, and in particular the layer 64 extends outwardly of the layer 62.

In this method, however, the longitudinal spacing of the layers on the sheet 86 need not correspond to the length of a final bag. In fact, it is preferred that the localized layers are spaced closely together, although not touching. Upon setting of the layer by the chill assembly 82 (formed of a low friction material due to the exterior placement of layer 62 in this embodiment), the sheet 86 is rolled. Again, since the layer 62 is exterior in this embodiment it is important to employ double sided release sheet.

The roll of sheet 86 with localized layers thereon will at some later time be used as a transfer sheet as shown in FIG. 11. In particular, substrate material 52 will be fed from a roll (or as the output from the process forming the substrate) across a pair of idler rollers 70 which define an application area. The release sheet 86 with the layers adhered thereto will also be fed from a roll across a pair of rollers 88 which are connected to a reciprocating piston assembly 90. The layers 63 and 64 are oriented to face the substrate 52 as shown, and the rollers 88 are opposite the application area defined by rollers 70.

The release sheet is fed an appropriate distance to bring a set of layers 62 and 64 between the rollers 80, and the substrate 52 is fed the length of a bag. As noted above, these distances may be, but are not necessarily, equal. Once the sheet 86 and substrate 52 are in the proper position the piston assembly 90 is extended to press the set of layers 62 and 64 against the substrate to transfer the layers to the substrate. The piston is then retracted and the sheet 86 and substrate 52 advanced to the next position for application of the next set of layers. There may be provided a pressure nip or heated roller assembly to aid in transfer either during or after extension of the piston assembly.

This will result in the tacky secondary seal layer 62 being secured to the substrate 52 with the outer layer 64 in covering relation. As such, the substrate 52 with applied localized layers may be rolled as in the previous embodiments.

It is noted that the application of the layers to the substrate in this second method is generally quite fast, but more importantly is not unduly affected by intermittent stoppages. This is not the case with processes including extrusion, and is difficult in processes including ribbon coating. Because this application can accommodate such stoppages, it is possible to incorporate the transfer step of FIG. 11 into a form, fill, and seal machine, such that the substrate and applied layers are not rolled, but instead are fed directly into the packaging machinery.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. For example, the process of FIG. 10 could feed directly into the packaging machinery. This is contemplated by and is within the scope of the claims.

Various modifications can also be made. For example, the secondary seal layer 62 may be formed with a color contrasting with the initial and outer seal layers 60 and 64, to therefore prove a tamper-indicating feature. The various embodiments and processes may also be useful in other combinations.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. In a method of making stock material for reclosable flexible bags, the improvement comprising the steps of:

providing a substrate, said substrate including an inner face and an initial seal layer on said inner face, said initial seal layer being capable of forming a seal with itself;

applying, with a ribbon coater, localized areas of a secondary seal layer at discrete locations upon said inner initial seal layer of said substrate, said secondary seal layer being a tacky material; and applying an outer seal layer in covering relation to said localized area of said secondary seal layer, said outer seal layer being capable of forming a bond with said initial seal layer.

2. The improvement of claim 1, wherein said step os applying said secondary seal layer further comprises applying said tacky material at a thickness of between about 0.5 and 1.5 mils.

3. The improvement of claim 2, wherein said step of applying said outer seal layer further comprises said outer seal layer being a heat sensitive adhesive.

4. The improvement of claim 1, wherein said step of applying said outer seal layer is performed by use of a ribbon coater.

5. The improvement of claim 4, wherein said step of applying said outer seal layer further comprises said outer seal layer being a heat sensitive adhesive.

6. The improvement of claim 4, wherein said step of supplying a substrate further includes said initial seal layer having areas of localized reduced thickness, and wherein said discrete locations are within said areas.

7. The improvement of claim 6, wherein said step of applying said outer seal layer is performed by use of a ribbon coater.

8. The improvement of claim 7, wherein said step of applying said outer seal layer further comprises said outer seal layer being a heat sensitive adhesive.

9. The improvement of claim 1, comprising the further step of feeding said substrate directly to a packaging machine.

* * * * *